US010721741B2

(12) United States Patent
Chen et al.

(10) Patent No.: US 10,721,741 B2
(45) Date of Patent: Jul. 21, 2020

(54) INTER-FREQUENCY MOBILITY SUPPORT FOR COMMUNICATION SYSTEMS WITH DYNAMIC SPECTRUM ASSIGNMENTS

(71) Applicant: MOTOROLA SOLUTIONS, INC., Chicago, IL (US)

(72) Inventors: Ethan Y. Chen, Wilmette, IL (US); Isam R. Makhlouf, Lake Zurich, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/151,451

(22) Filed: Oct. 4, 2018

(65) Prior Publication Data
US 2020/0112950 A1  Apr. 9, 2020

(51) Int. Cl.
*H04W 72/04* (2009.01)
*H04W 36/08* (2009.01)
*H04W 36/00* (2009.01)

(52) U.S. Cl.
CPC ..... *H04W 72/048* (2013.01); *H04W 36/0061* (2013.01); *H04W 36/08* (2013.01)

(58) Field of Classification Search
CPC ......... H04W 36/0055; H04W 36/0061; H04W 36/0066; H04W 36/0072; H04W 36/0077; H04W 36/0083; H04W 36/00835
See application file for complete search history.

(56) References Cited

U.S. PATENT DOCUMENTS

| 2016/0330743 A1 | 11/2016 | Das et al. |
| 2017/0118690 A1 | 4/2017 | Patel et al. |
| 2017/0295497 A1 | 10/2017 | Macmullan et al. |
| 2019/0246329 A1* | 8/2019 | Abouelmaati .. H04W 36/00835 |

FOREIGN PATENT DOCUMENTS

| WO | 2017207614 | 12/2017 |
| WO | 2018/172367 A1 | 9/2018 |

OTHER PUBLICATIONS

International Search Report and Written Opinion dated Dec. 4, 2019 for corresponding International Application No. PCT/US2019/053074 (15 pages).

\* cited by examiner

*Primary Examiner* — Pao Sinkantarakorn
(74) *Attorney, Agent, or Firm* — Michael Best & Friedrich LLP

(57) ABSTRACT

Systems and methods for enabling inter-frequency user equipment mobility in shared spectrum communication systems. One example system includes a communication interface coupled to an electronic processor. The electronic processor is configured to, for each of a plurality of base stations, determine a location for the base station. The electronic processor is configured to select at least one handover candidate from the plurality of base stations based on the location and at least one base station characteristic. The electronic processor is configured to determine a channel allocation. The electronic processor is configured to generate, based on the channel allocation of the at least one handover candidate, a neighbor channel list. The electronic processor is configured to transmit the neighbor channel list via the communication interface.

18 Claims, 5 Drawing Sheets

INTER-FREQUENCY MOBILITY SUPPORT FOR COMMUNICATION SYSTEMS WITH DYNAMIC SPECTRUM ASSIGNMENTS

BACKGROUND OF THE INVENTION

Radio frequency spectrum is divided into frequency bands, which are licensed to users by governments and other agencies. Some frequency bands are reserved for individual users (for example, a particular wireless communication system operator). Other bands are not assigned to particular users, but are instead shared and allocated dynamically among users, for example, by a spectrum management entity. Dynamic spectrum assignments allow users to request and use additional radio frequency spectrum as-needed. For example, the Citizens Broadband Radio Service (CBRS) dynamically allocates spectrum to cellular systems in the 3.5 GHz band. In a cellular network using dynamically-assigned radio frequency spectrum, the base stations' channel assignments may change over time.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
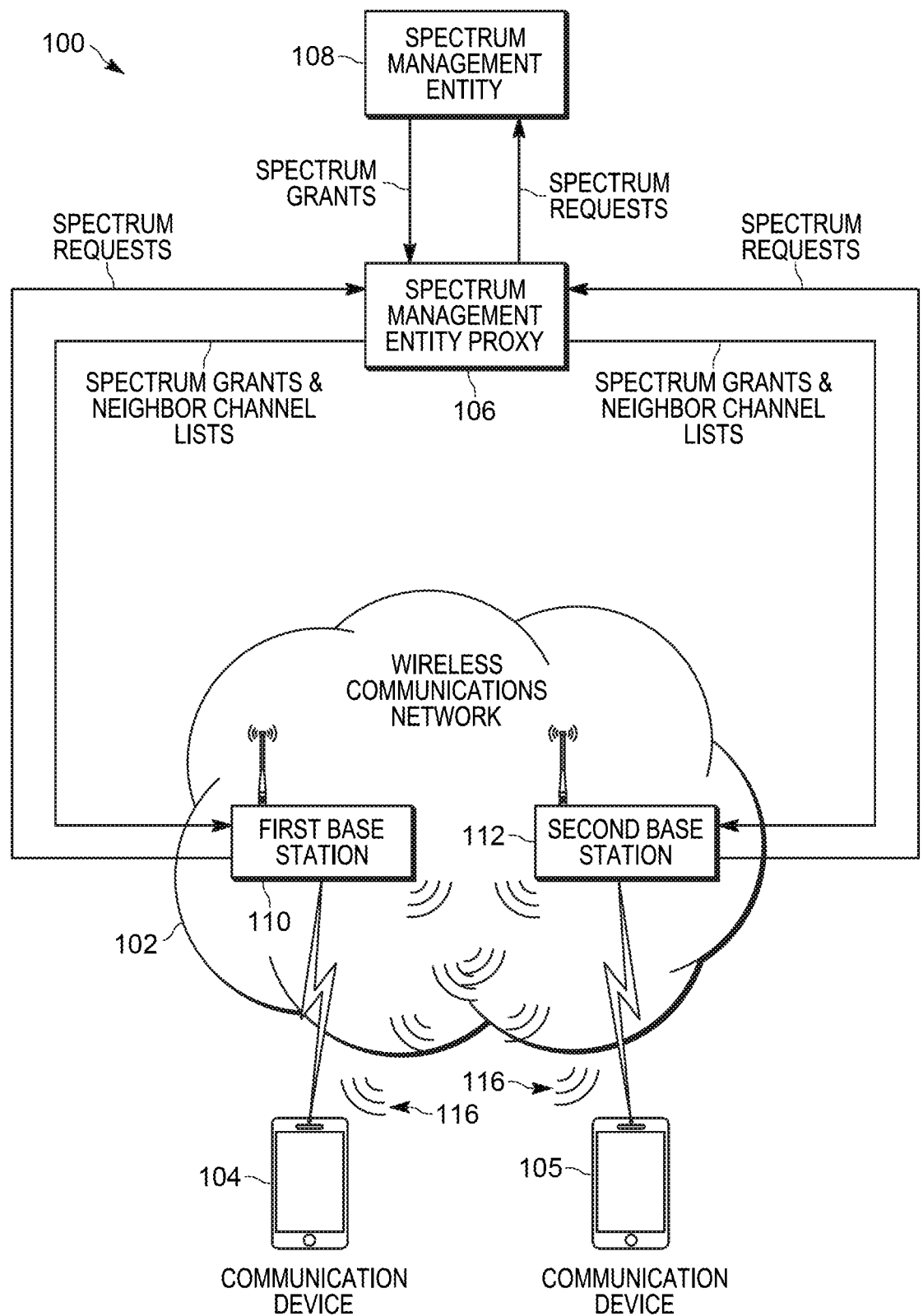
FIG. 1 is a diagram of a communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Citizens Broadband Radio Service (CBRS) systems include a Spectrum Access System (SAS), which dynamically allocates spectrum in the 3.5 GHz band to base stations in cellular (for example, Long-Term Evolution (LTE)) networks. In such networks, the base stations may be allocated and re-allocated different channels. The CBRS operates according to a priority plan. For example, in a CBRS system, communication devices operated by incumbent users (for example, government and military users, satellite users, and the like) have the highest priority level. Communication devices operated by Priority Access License (PAL) users have a lower priority than incumbent users, but a higher priority than General Authorized Access (GAA) users. PAL users are assigned particular portions of the CBRS band to use in particular geographic areas. GAA users are permitted to use any portion of the band not assigned to a higher priority user, but may also operate opportunistically on unused PAL channels.

At any time, the SAS may assign a base station's channel to another user, which requires the base station to cease use of the channel. Base stations in LTE networks rely on connected wireless devices (that is, user equipment) to perform neighbor cell measurements, for example, to determine when to handover user equipment to a neighboring base station. A base station configures its user equipment with the frequencies of its neighbors that operate on channels different from its own in order for the user equipment to perform inter-frequency measurements. In a statically-configured network, channel assignments rarely change, and neighboring channel assignments are known to the base stations. However, in a network with dynamic spectrum assignments, base stations are unaware of the operating channels of neighboring base stations. As a consequence, they are unable to configure their user equipment to perform inter-frequency neighbor cell measurements.

CBRS systems dynamically allocate from available shared channels. Pre-configuring user equipment to provide neighbor cell measurements for all of the possible channels is not practical. Constraining base stations to the same CBRS channel simplifies the taking of neighbor cell measurements. However, spectrum may not be available when needed, and the use of higher order reuse schemes is limited. This also reduces the flexibility ordinarily provided by the CBRS system, which allows for different bandwidth requests within a system to accommodate varying user densities or application profiles. Accordingly, systems and methods are provided herein for, among other things, enabling inter-frequency user equipment mobility in shared spectrum communication systems.

Embodiments provided herein include a spectrum management entity proxy, which assigns spectrum to base stations and determines neighbor channel lists. Using such embodiments, when base stations are able to configure their user equipment to take neighbor cell measurements, despite changing channel configurations. This allows base stations to more fully take advantage of the improvements offered by CBRS and other shared spectrum systems, while still efficiently performing user equipment handoffs. Embodiments described herein therefore result in more efficient use of communication system resources and the improved operation of the communication systems for users.

One example embodiment provides a system for enabling inter-frequency user equipment mobility in shared spectrum communication systems. The system includes a communication interface coupled to an electronic processor. The electronic processor is configured to, for each of a plurality of base stations, determine a location for the base station. The electronic processor is configured to select at least one handover candidate from the plurality of base stations based on the location and at least one base station characteristic. The electronic processor is configured to determine a channel allocation. The electronic processor is configured to generate, based on the channel allocation of the at least one handover candidate, a neighbor channel list. The electronic processor is configured to transmit the neighbor channel list via the communication interface.

Another example embodiment provides a method for enabling inter-frequency user equipment mobility in shared spectrum communication systems. The method includes, for each of a plurality of base stations, determining, with an electronic processor, a location for the base station. The method includes selecting, with the electronic processor, at least one handover candidate from the plurality of base stations based on the location and at least one base station characteristic. The method includes determining a channel allocation. The method includes generating, based on the channel allocation of the at least one handover candidate, a neighbor channel list. The method includes transmitting, via a communication interface coupled to the electronic processor, the neighbor channel list.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 illustrates an example communication system 100. The system 100 includes a wireless communications network 102, communication devices 104, 105, a spectrum management entity proxy 106, and a spectrum management entity 108. The illustrated components are communicatively coupled, for example, using the wireless communications network 102, one or more additional communications networks or links (not shown), or combinations thereof. For example, the spectrum management entity proxy 106 and the spectrum management entity 108 may communicate over a wide area network (WAN) (for example, a transport control protocol/internet protocol (TCP/IP)-based network), a local area network (for example, a Wi-Fi or Ethernet network), a wireless network, and combinations or derivatives thereof.

The wireless communications network 102 includes a first base station 110 and a second base station 112, each of which provides wireless communications service to a particular geographic area (for example, a cell). The first base station 110 and the second base station 112 provide wireless communication services to the communication devices 104, 105. In some embodiments, the communication devices 104, 105 are smart telephones. In some embodiments, the wireless communications network 102 is an LTE network, and each of the first base station 110 and the second base station 112 is an LTE Evolved Node B (eNodeB).

The first base station 110 and the second base station 112, described more particularly below with respect to FIG. 3, operate to provide communications to and from the communication devices 104, 105 using fixed radio frequency spectrum allocations, dynamically-allocated radio frequency spectrum, or a combination of both. As illustrated in FIG. 1, the first base station 110 and the second base station 112 send spectrum requests to the spectrum management entity proxy 106, requesting one or more channels of radio frequency spectrum. The spectrum management entity proxy 106 requests and receives spectrum allocations from the spectrum management entity 108. The spectrum management entity proxy 106 grants spectrum (for example, assigns channels) to the first base station 110 and the second base station 112 from the spectrum allocations received from the spectrum management entity 108.

In cellular networks, user equipment (for example, the communication devices 104, 105) is able to receive radio frequency signals from more than one base station (for example, the first and second base stations 110, 112.) For example, as illustrated in FIG. 1, the first and second base stations 110, 112 produce radio frequency signals 116. Each of the communication devices 104, 105 is able to receive the radio frequency signals 116 from each of the first and second base stations 110, 112. As noted, base stations in LTE networks rely on their respective connected user equipment to perform neighbor cell measurements. For example, the communication device 105 is able to measure the radio frequency signals 116 produced by the first base station 110, and report those measurements to the second base station 112. The second base station may use those measurements, for example, to determine when to handover the communication device 105 to the first base station 110. The second base station 112 configures the communication device 105 with the frequencies the first base station 110. As illustrated in FIG. 1, and described more particularly below, embodiments of the spectrum management entity proxy 106 determine a neighbor channel list for the first base station 110 and transmit the list to the second base station 112. The spectrum management entity proxy 106 also determines a neighbor channel list for the second base station 112 and transmits the list to the first base station 110.

In some embodiments, the first and second base stations 110, 112, the spectrum management entity proxy 106, and the spectrum management entity 108 operate according to the Citizens Broadband Radio Service (CBRS) standard developed by the Wireless Innovation Forum (WInnForum). In such embodiments, spectrum management entity proxy 106 is or includes a CBRS Spectrum Access System (SAS) Domain Proxy, the spectrum management entity 108 is a Spectrum Access System, and the first and second base stations 110, 112 are CBSDs (Citizens Broadband Radio Service Devices).

Although embodiments are described herein in terms of a CBRS shared spectrum system, this is by way of example only. It should be noted that the embodiments presented may be used with communication systems having using dynamic spectrum management that operates according to other standards.

Figure 2:
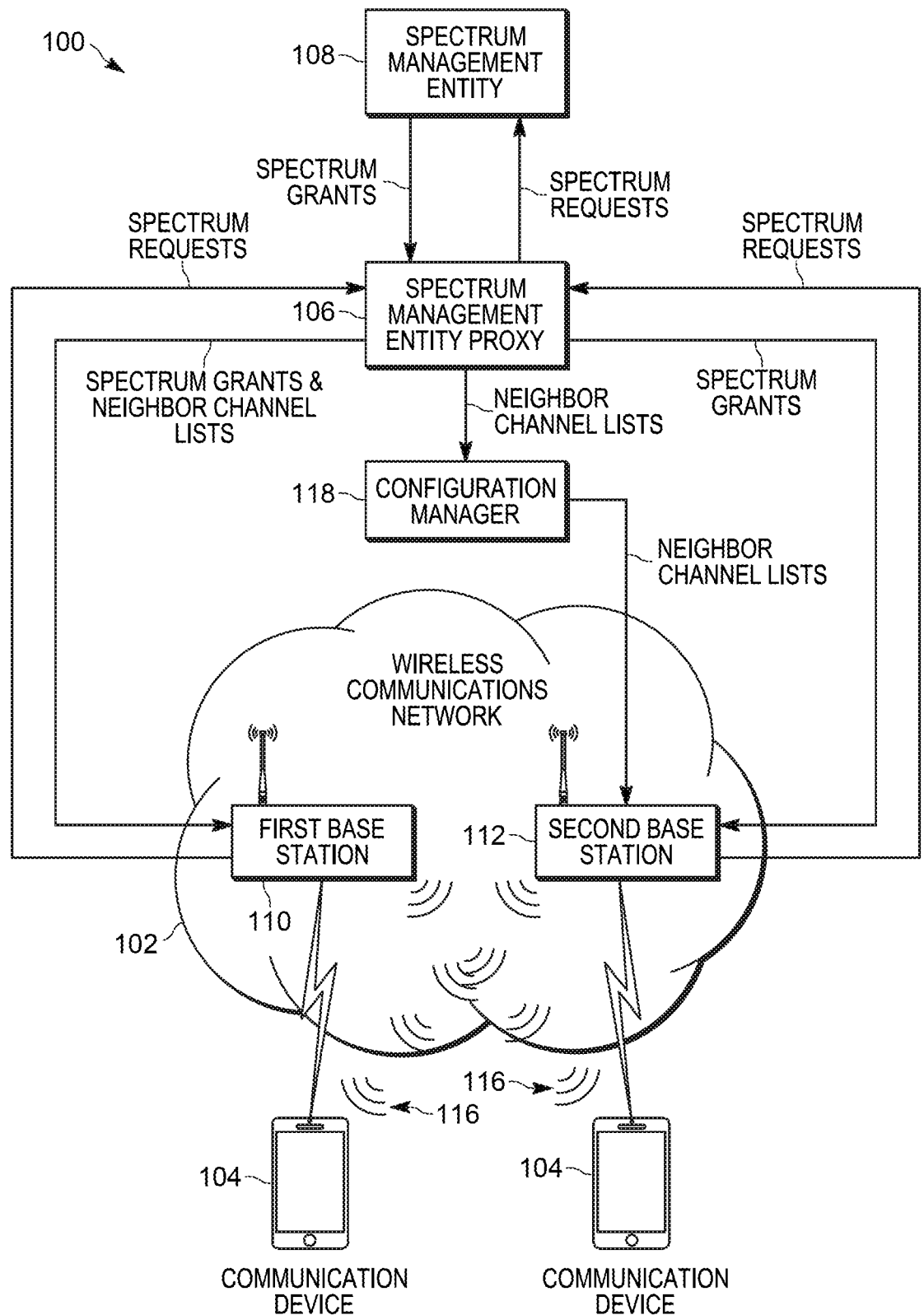
FIG. 2 is a diagram of an alternate embodiment of the communication system of FIG. 1.

As illustrated in FIG. 1, in some embodiments, the spectrum management entity proxy 106 transmits neighbor channel lists directly to base stations. In other embodiments, the spectrum management entity proxy 106 transmits neighbor channel lists indirectly to some or all of the base stations. For example, FIG. 2 illustrates an alternative embodiment of the communication system 100 that includes a configuration manager 118. The configuration manager 118, the second base station 112, and the spectrum management entity proxy 106 are communicatively coupled, as described above with respect to FIG. 1. In the illustrated embodiment, the spectrum management entity proxy 106 communicates the neighbor channel lists for the second base station 112 to the configuration manager 118, which in turn sends the lists to the second base station 112. In some embodiments, the neighbor channel lists are communicated to and from the configuration manager 118 via the Simple Network Management Protocol (SNMP).

Figure 3:
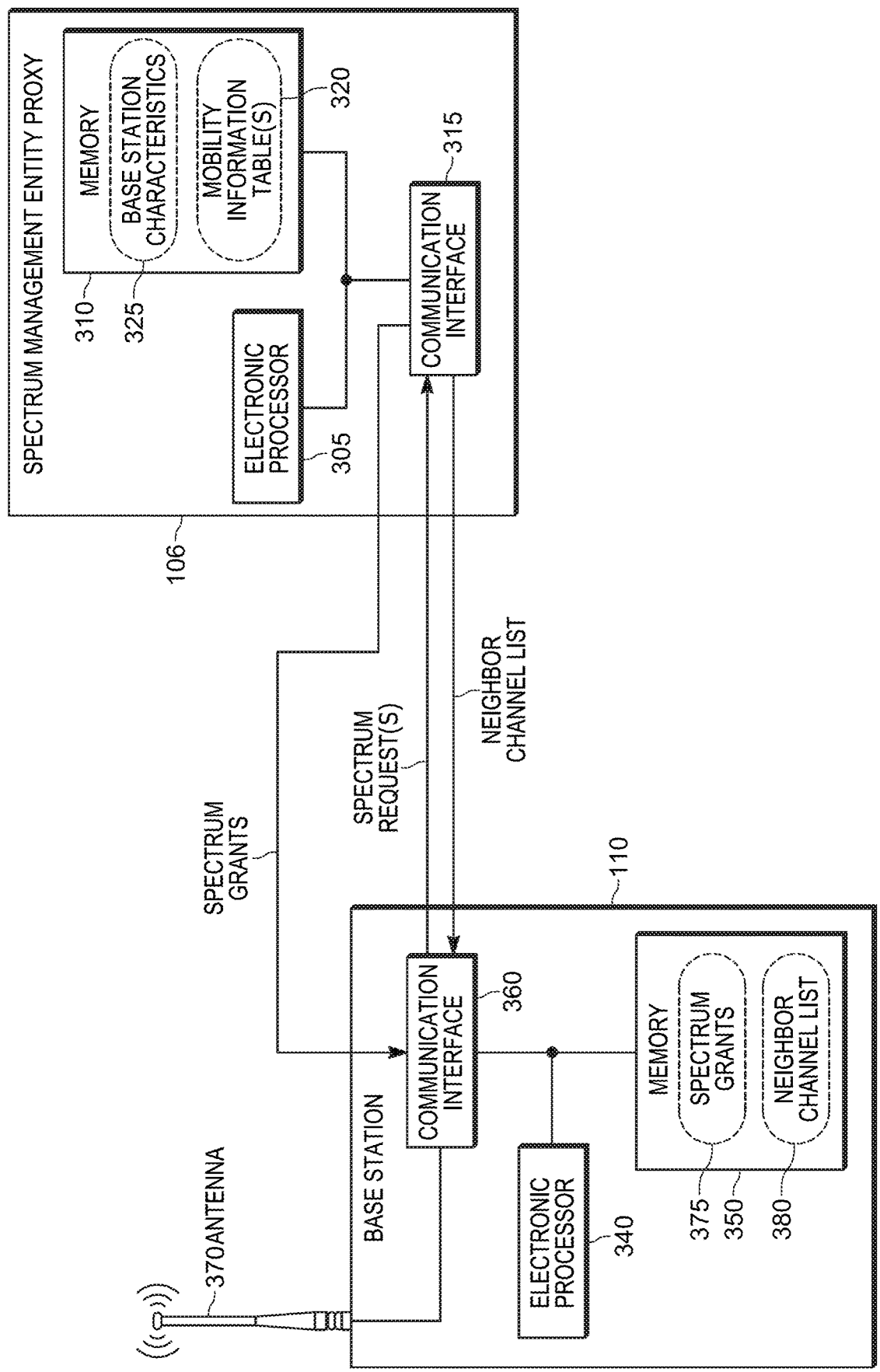
FIG. 3 is a diagram of a spectrum management entity proxy and a base station included in the communication system of FIG. 1, in accordance with some embodiments.

FIG. 3 schematically illustrates an example spectrum management entity proxy 106 and an example first base station 110 more detail. In the embodiment illustrated, the spectrum management entity proxy 106 includes an electronic processor 305, a memory 310, and a communication interface 315. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 305 may include one or more microprocessors, an application-specific integrated circuit (ASIC), or another suitable electronic device. The electronic processor 305 is configured to obtain and provide information (for example, from the memory 310 and/or the communication interface 315), and process the information by executing one or more software instructions or modules, capable of being stored, for example, in a random access memory ("RAM") area of the memory 310 or a read only memory ("ROM") of the memory 310 or another non-transitory computer readable medium (not shown). The software can include firmware, one or more applications, program data, filters, rules, one or more program modules, and other executable instructions. The electronic processor 305 is configured to retrieve from the memory 310 and execute, among other things, software related to the control processes and methods described herein. The memory 310 can include one or more non-transitory computer-readable media, and includes a program storage area and a data storage area. The program storage area and the data storage area can include combinations of different types of memory, as described herein. In the embodiment illustrated, the memory 310 stores, among other things, mobility information tables 320 and base station characteristics 325 (both described in detail below) for the first and second base stations 110, 112.

The communication interface 315 is configured to receive input and to provide system output. The communication interface 315 includes hardware for communicating over one or more wired or wireless communication networks or connections. For example, in some embodiments, the communication interface 315 includes at least one transceiver. In some embodiments, the transceivers are combined transmitter-receiver components. In other embodiments, the transceivers include separate transmitter and receiver components. The electronic processor 305 is configured to control the communication interface 315 to transmit and receive data to and from, for example, the first and second base stations 110, 112 and the spectrum management entity 108. In some embodiments, communications with the first and second base stations 110, 112 and the spectrum management entity 108 occur via distinct logical or physical interfaces. The electronic processor 305 and the communication interface 315 may include various digital and analog components, which for brevity are not described herein and which may be implemented in hardware, software, or a combination of both.

In the example provided, the first base station 110 includes an electronic processor 340, a memory 350, and a communication interface 360. The electronic processor 340, the memory 350, and the communication interface 360 communicate over one or more communication lines or buses, wirelessly, or a combination thereof. These components are similar to those described above with respect to the spectrum management entity proxy 106, and perform similar functions. For example, the electronic processor 340 executes instructions stored in the memory 350 to implement functionality of the first base station 110, such as to control the communication interface 360 to transmit and receive digital radio signals to and from, for example, the communication devices 104, 105 using the antenna 370. In the embodiment illustrated, the memory 350 also stores, among other things, spectrum grants 375 and a neighbor channel list 380 received from the spectrum management entity proxy 106.

As noted, shared spectrum systems (for example, the system 100) assign channels to base stations (for example, the first and second base stations 110, 112) from a spectrum pool available to many users and systems, based on, in part, priority. As a consequence, the channels assigned to the base stations of the wireless communications network 102 may change over time. In order for a base station properly configure its user equipment to monitor its neighbors, it must be aware of its neighbors current channel assignments. Accordingly, FIG. 4 illustrates a method 400 for enabling inter-frequency user equipment mobility in shared spectrum communication systems.

The method 400 is described as being performed by the spectrum management entity proxy 106 and, in particular, the electronic processor 305. However, it should be understood that in some embodiments, portions of the method 400 may be performed by other devices, including for example, the spectrum management entity 108. While FIG. 1 illustrates two base stations 110, 112 and two communication devices 104, 105, it should be understood that embodiments of the method 400 may be used to enable inter-frequency user equipment mobility for more or fewer base stations and communication devices than illustrated. Embodiments may also include more than one spectrum management entity 108 or spectrum management entity proxy 106.

The method 400 is performed for each of a plurality of base stations of a system (or systems) under the management of the spectrum management entity proxy 106 (for example, the first and second base stations 110, 112). The method 400 is repeated periodically or continuously to account for changes in channel allocations to the plurality base stations over time, as described herein.

Figure 4:
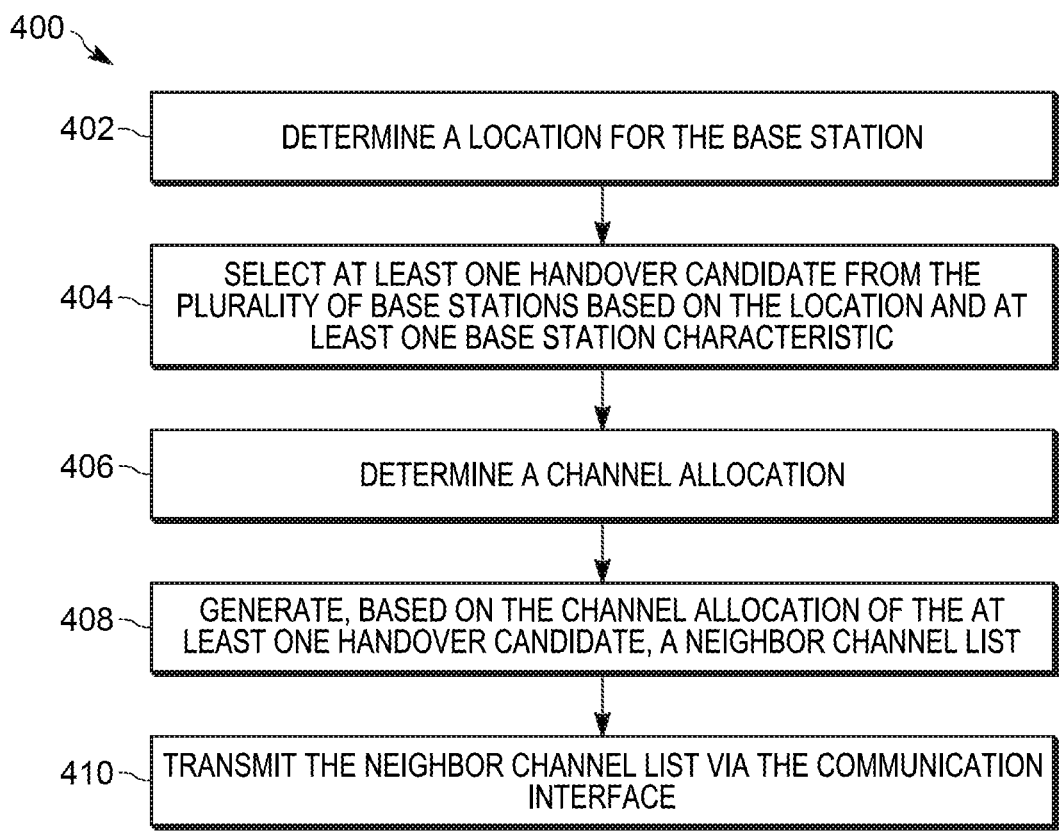
FIG. 4 is a flowchart of a method for enabling inter-frequency user equipment mobility in shared spectrum communication systems, in accordance with some embodiments.

As illustrated in FIG. 4, at block 402, the electronic processor 305 determines a location for the base station. In some embodiments, the electronic processor 305 queries the base station to request its location. In some embodiments, the locations of the base stations are stored in and retrieved from the memory 310 or in remote database. In some embodiments, the base stations periodically send their locations to the spectrum management entity proxy 106.

At block 404, the electronic processor 305 selects, for the base station in question, one or more handover candidates from the plurality of base stations. A handover candidate is another base station, to which the base station will handover connection of one or more of its devices. In some embodiments, handover candidates are determined based on the location and at least one base station characteristic for the potential handover candidate. One example base station characteristic is a system membership. For example, a base station may not handover a connection to a base station from another system. Other examples of base station characteristics include a transmit power level, an antenna gain pattern, an antenna orientation, and a propagation environment, all of which determine whether the potential handover candidate would be able to provide a suitable wireless link to a communication device being handed over.

At block 406, the electronic processor 305 determines a channel allocation for the base station. In some embodiments, the electronic processor 305 determines the channel allocation by receiving, from the base station, a spectrum allocation request (for example, via the communication interface). The electronic processor 305 transmits the spectrum allocation request to a spectrum management entity. In response, the electronic processor 305 receives the channel allocation for the base station from the spectrum management entity. In some embodiments, the electronic processor 305 determines the channel allocation by receiving an unsolicited channel allocation (for example, a re-allocation) from the spectrum management entity 108. The electronic processor 305 transmits the channel allocation to the base station (for example, via the communication interface).

The electronic processor 305 determines (as in block 406) channel allocations for all of the plurality of base stations, including the one or more handover candidates. At block 408, the electronic processor 305 generates, based on the channel allocation of the one or more handover candidates, a neighbor channel list. The neighbor channel list represents the frequency bands (that is, channels) assigned to base stations, to which the base station in question may handover user equipment. The neighbor channel list is what a base station needs to configure its registered user equipment for neighbor cell measurement.

In some embodiments, the spectrum management entity proxy 106 generates and maintains a mobility information table for each system it manages (for example, the wireless communications network 102). A mobility information table is an electronic table containing information for each of the plurality of base stations (for example, stored in the memory 310 or on an external database server, accessible via one or more network connections). For example, the mobility information table may store, for each of the base stations of the wireless communication network 102, the channel allocation, one or more handover candidates, and the neighbor channel list.

At block 410, the electronic processor 305 transmits the neighbor channel list via the communication interface. In some embodiments, the electronic processor 305 transmits the neighbor channel list directly to the base station. In some embodiments, the electronic processor 305 transmits the neighbor channel list to a configuration manager associated with the base station. In some embodiments, a combination of approaches is used.

Figure 5:
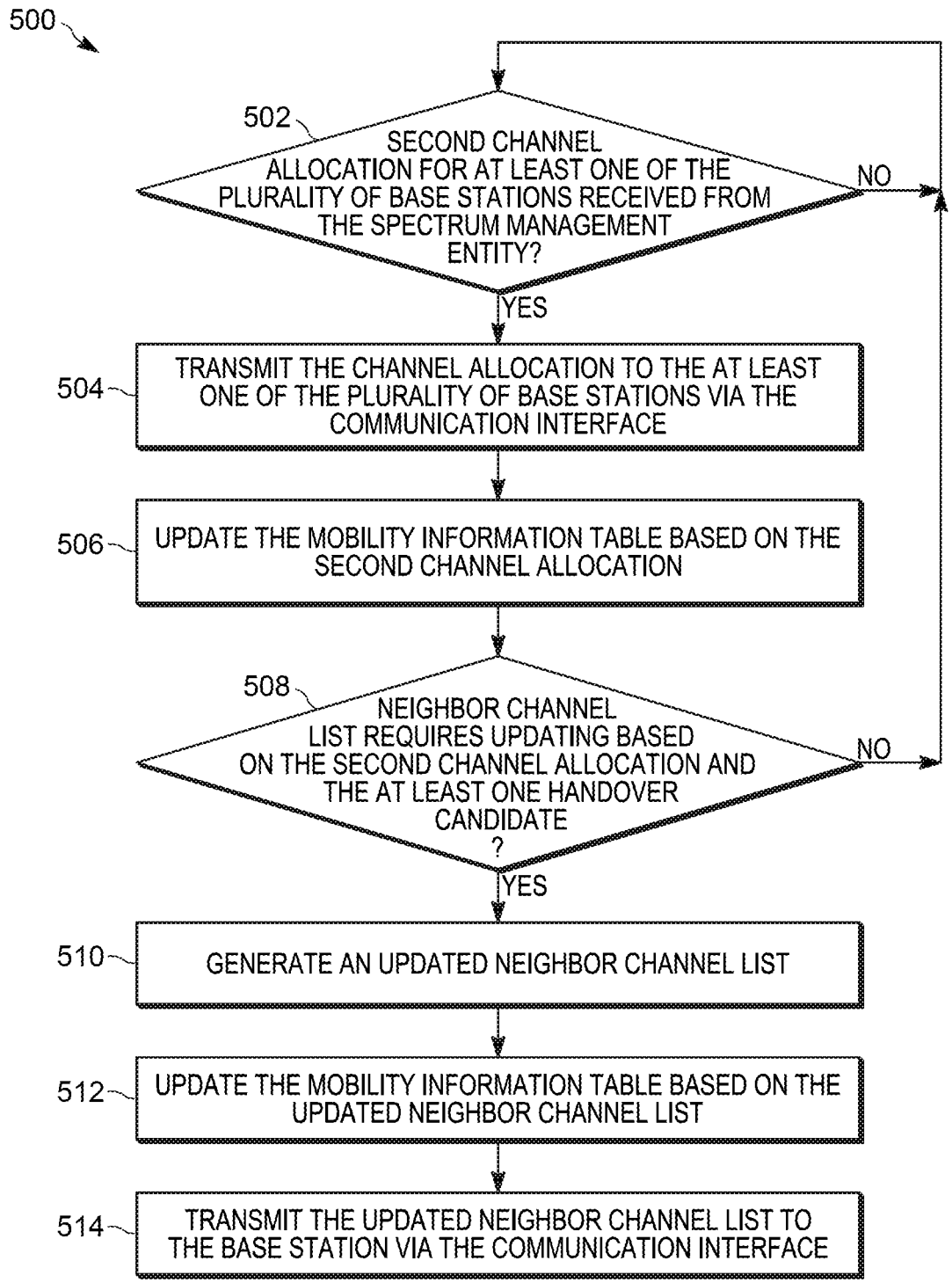
FIG. 5 is a flowchart of a method for enabling inter-frequency user equipment mobility in shared spectrum communication systems, in accordance with some embodiments.

As noted, the spectrum management entity 108 may, unsolicited, re-allocate channel allocations for a base station. FIG. 5 illustrates an example method 500 for enabling inter-frequency user equipment mobility in shared spectrum communication system. The method 500 is described as being performed by the spectrum management entity proxy 106 and, in particular, the electronic processor 305. However, it should be understood that in some embodiments, portions of the method 500 may be performed by other devices, including for example, the spectrum management entity 108.

At block 502, when the electronic processor 305 receives a second channel allocation from the spectrum management entity for one or more of the plurality of base stations, it transmits the second channel allocation(s) to the one or more base stations (at block 504). For example, the spectrum management entity 108 may revoke a channel allocation and provide a replacement channel allocation. As illustrated, when the electronic processor 305 has not received a second channel allocation, it continues to listen for such an allocation (at block 502).

At block 506, the electronic processor 305 updates the mobility information table (described above with respect to FIG. 4) to reflect the second channel allocation.

At block 508, in response to receiving the second channel allocation, the electronic processor 305, for each of the plurality of base stations, determines whether the neighbor channel list requires updating. In some embodiments, the electronic processor 305 makes this determination based on the second channel allocation and the one or more handover candidates for the base station. For example, if the second channel allocation was to one of the handover candidates, and is not already present in the neighbor channel list, the electronic processor 305 determines that the neighbor channel list needs updating to include the second channel allocation. When no update is required, at block 508, the electronic processor 305 continues to listen for another updated allocation (at block 502).

In response to determining that the neighbor channel list requires updating (at block 508), the electronic processor 305 generates an updated neighbor channel list.

At block 512, the electronic processor 305 updates the mobility information table based on the updated neighbor channel list (generated at block 510).

At block 514, the electronic processor 305 transmits the updated neighbor channel list to the base station via the communication interface.

In some embodiments, the method 500 is repeated continuously or periodically to monitor and account for changes to channel allocations to base stations under its management.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for enabling inter-frequency user equipment mobility in shared spectrum communication systems, the system comprising:
   a communication interface; and
   an electronic processor, coupled to the communication interface and configured to, for each of a plurality of base stations,
      determine a location for the base station;
      select at least one handover candidate from the plurality of base stations based on the location and at least one base station characteristic;
      receive, from the base station, a spectrum allocation request via the communication interface;
      transmit the spectrum allocation request to a spectrum management entity via the communication interface;
      receive, via the communication interface, a channel allocation for the base station from the spectrum management entity;
      generate, based on the channel allocation of the at least one handover candidate, a neighbor channel list; and
      transmit the neighbor channel list via the communication interface.

2. The system of claim 1, wherein the at least one base station characteristic includes at least one selected from the group consisting of a system membership, a transmit power level, an antenna gain pattern, an antenna orientation, and a propagation environment.

3. The system of claim 1, wherein the electronic processor is configured to transmit the neighbor channel list via the communication interface by transmitting the neighbor channel list to one selected from the group consisting of the base station and a configuration manager associated with the base station.

4. The system of claim 1, wherein the electronic processor is further configured to transmit the channel allocation to the base station via the communication interface.

5. The system of claim 1, wherein the electronic processor is further configured to generate a mobility information table based on, for each of the plurality of base stations, the channel allocation, the at least one handover candidate, and the neighbor channel list.

6. The system of claim 5, wherein the electronic processor is further configured to
   receive, for at least one of the plurality of base stations, a second channel allocation from the spectrum management entity;
   transmit the channel allocation to the at least one of the plurality of base stations via the communication interface; and
   update the mobility information table based on the second channel allocation.

7. The system of claim 6, wherein the electronic processor is further configured to, for each of the plurality of base stations,
   determine, based on the second channel allocation and the at least one handover candidate, whether the neighbor channel list requires updating;
   in response to determining that the neighbor channel list requires updating,
      generate an updated neighbor channel list;
      update the mobility information table based on the updated neighbor channel list; and
      transmit the updated neighbor channel list to the base station via the communication interface.

8. The system of claim 1, wherein the each of the plurality of base stations is one selected from the group consisting of a long-term evolution (LTE) eNodeB and a Citizens Broadband radio Service Device (CBSD).

9. The system of claim 1, wherein the spectrum management entity is a Citizens Broadband Radio Service (CBRS) Spectrum Access System (SAS).

10. A method for enabling inter-frequency user equipment mobility in shared spectrum communication systems, the method comprising:
   for each of a plurality of base stations,
      determining, with an electronic processor, a location for the base station;

selecting, with the electronic processor, at least one handover candidate from the plurality of base stations based on the location and at least one base station characteristic;

receiving, from the base station, a spectrum allocation request via the communication interface;

transmitting the spectrum allocation request to a spectrum management entity via the communication interface;

receiving, via the communication interface, a channel allocation for the base station from the spectrum management entity;

generating, based on the channel allocation of the at least one handover candidate, a neighbor channel list; and transmitting, via a communication interface coupled to the electronic processor, the neighbor channel list.

11. The method of claim 10, wherein selecting at least one handover candidate based on at least one base station characteristic includes selecting at least one handover candidate based at least one selected from the group consisting of a system membership, a transmit power level, an antenna gain pattern, an antenna orientation, and a propagation environment.

12. The method of claim 10, wherein transmitting the neighbor channel list includes transmitting the neighbor channel list to one selected from the group consisting of the base station and a configuration manager associated with the base station.

13. The method of claim 10, further comprising transmitting the channel allocation to the base station via the communication interface.

14. The method of claim 10, further comprising generating a mobility information table based on, for each of the plurality of base stations, the channel allocation, the at least one handover candidate, and the neighbor channel list.

15. The method of claim 14, further comprising:
receiving, for at least one of the plurality of base stations, a second channel allocation from the spectrum management entity;
transmitting the channel allocation to the at least one of the plurality of base stations via the communication interface; and
updating the mobility information table based on the second channel allocation.

16. The method of claim 15, further comprising:
for each of the plurality of base stations,
determining, based on the second channel allocation and the at least one handover candidate, whether the neighbor channel list requires updating;
in response to determining that the neighbor channel list requires updating,
generating an updated neighbor channel list;
updating the mobility information table based on the updated neighbor channel list; and
transmitting the updated neighbor channel list to the base station via the communication interface.

17. The method of claim 10, wherein the each of the plurality of base stations is one selected from the group consisting of a long-term evolution (LTE) eNodeB and a Citizens Broadband radio Service Device (CBSD).

18. The method of claim 10, wherein the spectrum management entity is a Citizens Broadband Radio Service (CBRS) Spectrum Access System (SAS).

* * * * *